United States Patent [19]

Sohne

[11] Patent Number: 4,948,192

[45] Date of Patent: Aug. 14, 1990

[54] WINDSHIELD COVER APPARATUS

[76] Inventor: Jay M. Sohne, 202 Oak Forest Ter., Euless, Tex. 76039

[21] Appl. No.: 346,191

[22] Filed: May 2, 1989

[51] Int. Cl.$^5$ ................................................ B60J 1/20
[52] U.S. Cl. .................................. 296/95.1; 160/370.2
[58] Field of Search ..................... 296/95.1; 160/370.2

[56] References Cited

U.S. PATENT DOCUMENTS

| 2,489,901 | 11/1949 | Kocinski | 160/370.2 |
| 2,599,066 | 6/1952 | Osborn | 160/370.2 |
| 4,406,320 | 9/1983 | Bingham | 296/95.1 |
| 4,597,608 | 7/1986 | Duffy | 296/95.1 |

Primary Examiner—Robert R. Song
Attorney, Agent, or Firm—Henderson & Sturm

[57] ABSTRACT

A windshield cover apparatus (10) adapted to cooperate with the windshield (101) the steering wheel (103) and the sun visor support arms (105) of a vehicle (100) wherein the apparatus (10) includes a cover unit (11) provided with a pair of upper and lower adjustable securing strap members (20) (20') (21) (21') equipped with hook elements (22) which are adapted to engage the steering wheel (103) and the sun visor support arms (105) of the vehicle (100).

1 Claim, 1 Drawing Sheet

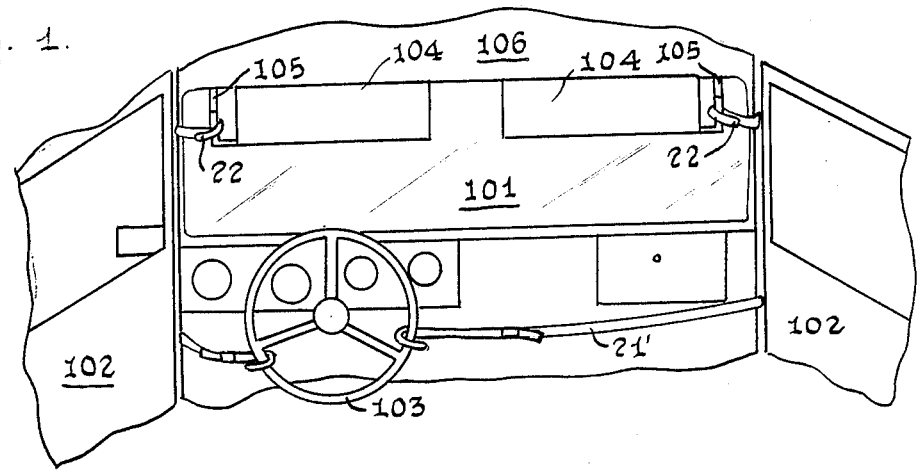
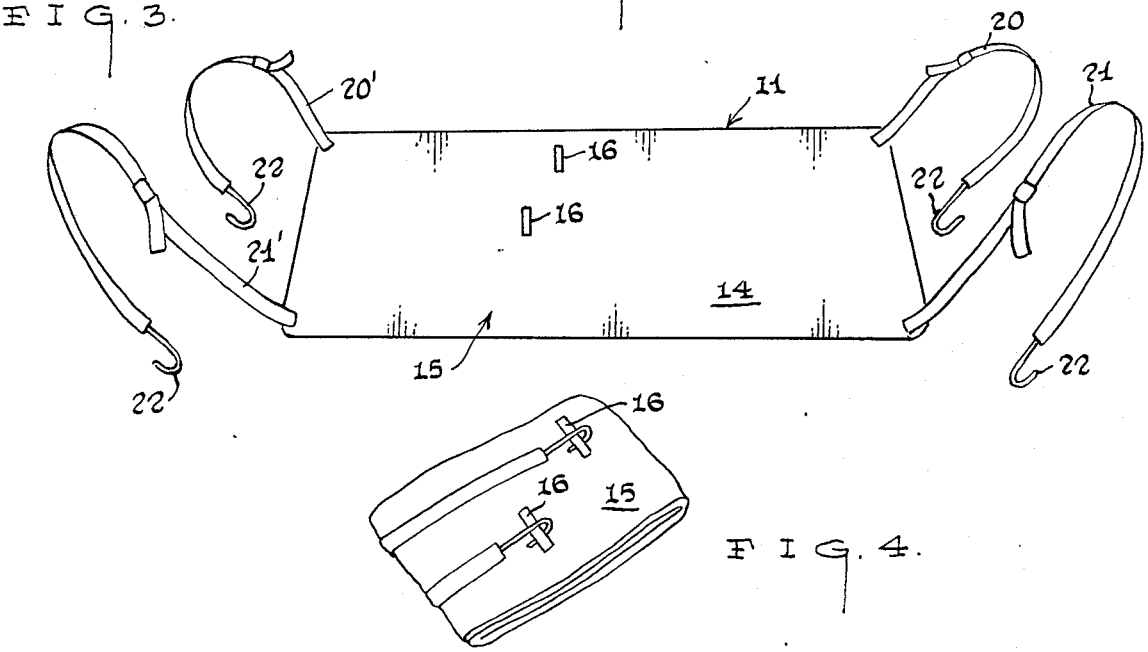

4,948,192

WINDSHIELD COVER APPARATUS

TECHNICAL FIELD

The present invention relates generally to a vehicle windshield cover, and in particular to a windshield cover designed to cover and protect a windshield from ice formation and which is also adapted to releasably engage interior portions of a vehicle.

BACKGROUND OF THE INVENTION

This invention was the subject matter of Document Disclosure Program Registration Number 200968 which was filed in the U.S. Patent and Trademark Office on Sept. 12, 1988.

As can be seen by reference to the following U.S. Pat. No's. 4,635,993; 3,964,780; 3,874,437 and 2,979,129 the prior art is replete with myriad and diverse windshield cover constructions.

While all of the aforementioned prior art devices are more than adequate for the particular purpose and function for which they were specifically designed, these arrangements are also uniformly deficient in their design relative to their mode of attachment to a vehicle.

While some of the aforementioned patented constructions are intended to be entirely mounted on the exterior surface of a vehicle, the vast majority of this type of a device envisions the operative engagement between the cover and the vehicle occurring by the captive engagement of the cover securing elements between the vehicle door and/or window and the vehicle frame.

Based on the foregoing situation there has existed a longstanding need among users of this type of a device for an improved securing arrangement for windshield covers; wherein, the securing arrangement comprises a plurality of adjustable length straps that are dimensioned to engage conventional interior structural components of a vehicle.

SUMMARY OF THE INVENTION

Briefly stated, the windshield cover apparatus that forms the basis of the present invention comprises a cover unit that is dimensioned to overlie a substantial portion of the vehicle windshield and a securing unit that is adapted to operatively secure the cover unit to both the exterior and the interior of the vehicle.

The cover unit comprises a generally rectangular mat member formed from water impervious material; and, the securing unit comprises an upper and a lower pair of adjustable length strap members operatively secured on one end proximate the four corners of the mat member and provided on their free ends with hook elements that are adapted to engage conventional structural elements found in the interior of a vehicle.

In addition, as will also be explained in greater detail further on in the specification the upper pair of strap members are relatively short and of approximately the same length; whereas, both of the lower strap members are longer than the upper strap members, and one of the lower strap members is substantially longer than the other.

BRIEF DESCRIPTION OF THE DRAWINGS

These and other objects, advantages and novel features of the invention will become apparent from the detailed description of the best mode for carrying out the preferred embodiment of the invention which follows; particularly when considered in conjunction with the accompanying drawings, wherein:

FIG. 1 is a perspective view of the interior of a vehicle equipped with the windshield cover apparatus;

FIG. 2 is a perspective view of the vehicle depicted in FIG. 1;

FIG. 3 is an isolated perspective view of the windshield cover apparatus unfolded; and, FIG. 4 is a perspective view of the windshield cover apparatus folded.

BEST MODE FOR CARRYING OUT THE INVENTION

As can be seen by reference to the drawings and in particular to FIG. 3, the windshield cover apparatus that forms the basis of the present invention is designated generally by the reference numeral (10). The apparatus (10) comprises in general: a cover unit (11) and a securing unit (12). These units will now be described in seriatim fashion.

Prior to embarking on a detailed description of the preferred embodiment of the apparatus (10) it would first be advisable to describe the environment in which the apparatus is intended for use. As can be seen by reference to FIGS. 1 and 2, this environment comprises a vehicle (100) having a windshield (101); a pair of front doors (102); a steering wheel (103) and a pair of sun visors (104) pivotally secured from support arms (105) that are suspended from the roof (106) of the vehicle (100).

Turning now to FIGS. 2 and 3, it can be appreciated that the cover unit (11) comprises a generally rectangular mat member (13) fabricated from a waterproof material (14) such as rubber, plastic, or the like. In addition, the external face (15) of the mat member (13) is further provided with a plurality of loop elements (16) whose purpose and function will be described presently.

As can best be seen by reference to FIGS. 1 thru 3, the securing unit (12) comprises in general: an upper (20)(20') and a lower (21)(21') pair of adjustable length securing strap members; wherein, each of the strap members (20)(20')(21) and (21') are secured on one end proximate the corners of the mat member (13) and provided on their free ends with a hook element (22).

As can be appreciated particularly by reference to Figs. 1 and 3, the upper pair of strap members (20)(20') are relatively short in length; in as much as, they are dimensioned to engage via their respective hook elements (22) the support arms (105) of the sun visors (104). In addition, while both of the lower strap members (21)(21') are longer than the upper strap members (20)(20') one of the lower strap members (21') is significantly longer than the other lower strap member (21); in as much as, both lower strap members (21)(21') are dimensioned to engage via their respective hook elements (22) the periphery of the vehicle steering wheel (103) to install the apparatus (10) on the vehicle (100).

Turning now to FIG. 4, it can be appreciated that the loops (16) that are provided on the mat member (13) are intended to retain the hook elements (22) on the ends of the strap members (20)(20')(21) and (21') when the apparatus is folded for storage purposes.

Having thereby described the subject matter of this invention it should be apparent than many substitutions, modifications and variations of the invention are possible in light of the above teachings. It is therefore to be understood that the invention as taught and described herein is only to be limited to the extent of the breadth and scope of the appended claims.

I claim:

1. A windshield cover apparatus for use with a vehicle having a windshield; a steering wheel; a pair of front doors and a pair of sun visors suspended from the roof of the vehicle by support arms wherein the apparatus consists of:

a cover unit comprising a generally rectangular cover member dimensioned to overlie the vehicle windshield; and, a securing unit comprising an upper and a lower pair of adjustable strap members secured on one end proximate the corners of the generally rectangular cover member and provided on their other ends with a hook element which is adapted to engage a selected one among the steering wheel and sun visor support arms of said vehicle;

wherein, the combined length of the upper pair of strap members are relatively short and are dimensioned to engage the respective nearest support arms of the sun visors via their respective hook elements; and, wherein the combined length of the lower pair of strap members are longer than the upper pair of strap members, and one of the pair of lower strap members is substantially longer than the other lower strap member such that the hook elements on the respective lower strap members will engage the opposite sides of the vehicle steering wheel.

* * * * *